3,586,701
NORZEARALANE AND ITS PRODUCTION
Wilbert H. Urry, Chicago, Ill., assignor to Commercial
Solvents Corporation, New York, N.Y.
No Drawing. Filed Aug. 24, 1967, Ser. No. 662,855
Int. Cl. C07d 9/00
U.S. Cl. 260—343.2
2 Claims

ABSTRACT OF THE DISCLOSURE

A new compound and a method for its manufacture is disclosed. The compound d,l-norzearalane is illustrated by the formula:

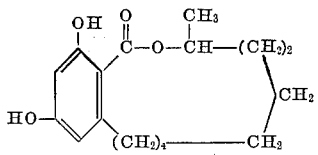

The compound d,l-norzearalane can be used to aid in increasing the rate of growth in meat-producing animals.

---

The present invention relates to a new compound and to a method for its manufacture. An object of the present invention is to provide compounds which exhibit estrogenic activity or aid in increasing the rate of growth in meat-producing animals, e.g., cattle, lamb and swine.

The compound of this invention is illustrated by the formula:

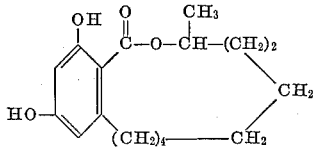

The above compound can be prepared by chemical synthesis and has been given the name d,l-norzeararalane to conform with the nomenclature set forth in an article in "Tetrahedron Letters" No. 27, pages 3109–3114, 1966, Pergamon Press, Ltd. The compound of this invention, besides being a racemic mixture, has one less methylene group in the saturated ring than does one of the compounds described and claimed in United States Letters Patent No. 3,239, 341 issued Mar. 8, 1966 to Hodge et al. This latter compound can be prepared by reduction of a fermentation estrogenic substance (F.E.S.) produced in turn by cultivating, on a suitable nutrient medium, the organism Gibberrela zeae (Gordon) on deposit at the Northern Utilization Research and Development Division of the United States Department of Agriculture under the number NRRL–2830.

The compound of this invention can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compound is to be administered in feeds, an animal feed composition can be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The following examples serve to illustrate the invention:

EXAMPLE I

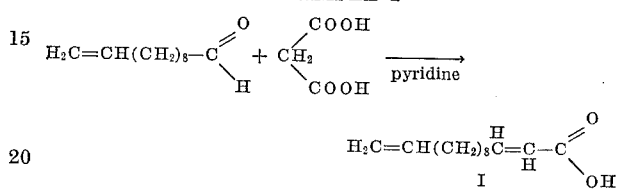

A reaction mixture containing 10-undecenal (100.8 g., 0.99 mole), malonic acid (41.6 g., 0.400 mole) and pyridine (140 g.) was stirred at 25° C. for 24 hours. More malonic acid (41.6 g., 0.400 mole) was added to it, and the reaction mixture was again stirred for 24 hours at 25° C. The reaction mixture was heated on a steam bath until carbon dioxide evolution ceased (10–12 hours). The reaction mixture was diluted with water (100 ml.), and the resulting mixture was extracted with diethyl ether (400 ml.). The ether solution was then washed with dilute hydrochloric acid (2 N, 4×50 ml.), and then with water. It was dried over anhydrous magnesium sulfate. Distillation of this ether solution gave unreacted 10-undecenal (B.P. 40° C. at 1 mm. Hg), and then 2,12-tridecadienoic acid I (B.P. 164° C. at 1 mm. Hg, 96.3 g., 0.458 mole, 76%).

EXAMPLE II

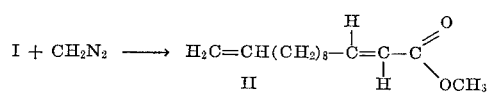

The 2,12-tridecadienoic acid I (96.3 g., 0.458 mole) was brought into reaction with diazomethane (20.2 g., 0.48 mole, prepared from N-methyl-N-nitrosotoluene sulfonamide) in diethyl ether. After the reaction was complete, the ether was removed and distillation of the residue gave methyl 2,12 - tridecadienoate II (93.5 g., 0.417 mole, 91%, B.P. 112–113° C. at 0.3 mm. Hg, $^1$H N.M.R. in CCl$_4$ with TMS: 12H envelope at 1.33δ; 4H multiplet at 2.12δ, J 7 c.p.s. apparent; 3H singlet at 3.66δ; typical 3H vinyl multiplet 4.7–6.2δ; 1H doublet at 5.78δ, J 15.5 c.p.s. with each peak a narrow triplet, J 1 c.p.s.; and 1H pair of triplets with J 15.5 c.p.s. between them and J 7 c.p.s. within them).

EXAMPLE III

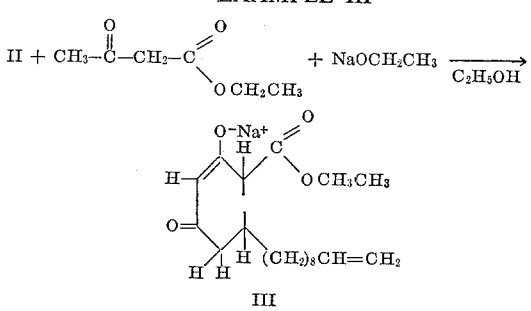

Sodium (10.8 g., 0.47 g. atom) was added to absolute ethanol (150 ml.). After the reaction of sodium was complete, ethyl acetoacetate (58.5 g., 0.45 mole) was added dropwise. This reaction mixture was heated at reflux while methyl 2,12 - tridecadienoate (81.0 g., 0.36 mole) also was added dropwise, and then it was held at reflux for 16 hours. After the reaction mixture had cooled, precipitated solid (102.0 g.) was removed on a filter, and it was washed with ether. This is the sodium salt of ethyl 6-(9-decenyl)-dihydro-β-resorcylate (82%) $^1$H N.M.R. in D$_2$O with DDS; 15H multiplet with large peak at 1.28δ and upper and lower peaks of triplet flanking it at 1.15 and 1.39δ; 4H multiplet 1.7–2.6δ with peaks at 1.93 and 2.22δ; 1H doublet at 3.13δ, J 10 c.p.s.; 2H quartet at 4.23δ, J 7 c.p.s.; 1H DOH peak at 4.58δ; and 3H vinyl multiplet 4.7–6.2δ).

To identify this sodium salt III, part of it (10.0 g., 0.029 mole) was dissolved in water (50 ml.), the aqueous solution was acidified with hydrochloric acid, and ethyl 6 - (9 - decenyl)-dihydro-β-resorcylate (M.P. 62° C. after recrystallization from ligroin, 60–68° C., 7.35 g., 0.0228 mole, 78.5%) precipitated.

*Analysis.*—Calcd. for C$_{19}$H$_{30}$O$_4$ (percent): C, 70.8; H 9.3. Found (percent): C, 70.6; H, 9.5.

EXAMPLE IV

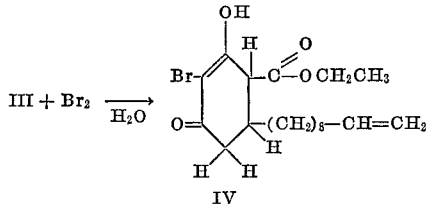

A solution of the sodium salt III (34.5 g., 0.101 mole) in water (700 ml.) was stirred vigorously while a solution of bromine (16.7 g., 0.104 mole) and sodium bromide (60.0 g., 0.583 mole) in water (200 ml.) was added dropwise over 4 hours. After the addition was complete, the reaction mixture was stirred for another 15 minutes.

The white solid that had precipitated was removed on a filter, and then it was dissolved in diethyl ether (500 ml.). The ether solution was washed with water (3×100 ml.), and then it was dried (MgSO$_4$). Drying time was limited to 1.5 hours since ths soluton began to turn yellow. The ether was then removed by evaporation (Rinco), and ligroin (200 ml., 30–60°) was added to the residual product with stirring. Crystalline ethyl 3-bromo - 6 - (9 - decenyl)-dihydro-β-resorcylate IV (M.P. 93–94°, 26.0 g., 0.0651 mole, 65%) precipitated. Its N.M.R. spectrum is $^1$H N.M.R. in CDCl$_3$ with TMS: 16H envelope at 1.31δ; 2H multiplet at 2.00δ, J 6 c.p.s.; 2H multiplet 2.3–2.9δ; 1H doublet at 3.38δ, J 9 c.p.s.; 2H quartet at 4.28δ, J 7 c.p.s.; 3H vinyl system 2.7–6.0δ and 1H broad singlet at 7.75δ). Evaporation of the ether ligroin filtrate gave an oil (35.0 g.) that had essentially the same N.M.R. spectrum as the crystalline product.

*Analysis.*—Calcd. for C$_{19}$H$_{29}$O$_4$Br (percent): C, 56.9; H, 7.3; Br, 19.9. Found (percent): C, 56.8; H, 7.1; Br, 20.1.

EXAMPLE V

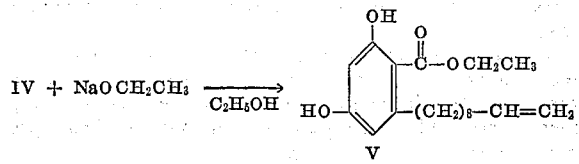

This bromoester IV (24.2 g., 0.06 mole) in sodium ethoxide solution (prepared from sodium, 12.1 g., 0.53 gram atoms, in anhydrous ethanol, 300 ml.) was maintained at reflux under nitrogen for 3 hours. Then the reaction mixture was held at 0° C. while it was neutralized by dropwise addition of concentrated sulfuric acid (12.5 ml. used) with stirring. This reaction mixture was evaporated (Rinco), and water (500 ml.) was added to the residue. The oil that separated was extracted with ether (3×150 ml.). The ether solution was dried (MgSO$_4$), and was decolorized with charcoal. Evaporation of the ether solution gave crude ethyl 6-(9-decenyl)-β-resorcylate V (18.26 g., 95%). $^1$H N.M.R. in CDCl$_3$ with TMS: 15H envelope with big peak at 1.32δ and two downfield peaks of triplet at 1.40δ, J 7 c.p.s.; 2H multiplet at 2.00δ; 2H triplet at 2.78δ, J 6 c.p.s.; 2H quartet at 4.06δ, J 7 c.p.s.; 3H vinyl multiplet 4.8–6.2δ; 2H singlet at 6.34δ; 1H singlet at 7.15δ; and 1H singlet at 11.88δ). Thin layer chromatography showed one large spot, R$_f$=0.66. This substance was obtained pure by recrystallization from ligroin (30–60° C., M.P. 45.5–46.5° C.).

*Analysis.*—Calcd. for C$_{19}$H$_{28}$O$_4$ (percent): C, 71.2; H, 8.8. Found (percent): C, 71.0; H, 8.6.

EXAMPLE VI

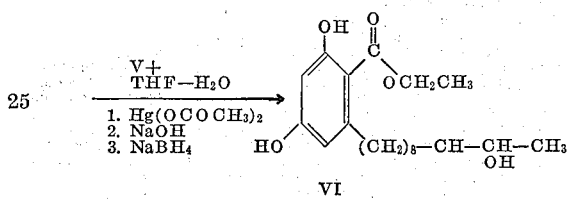

Ethyl 6-(9-decenyl)-β-resorcylate V (4.8 g., 0.015 mole) was added to a stirred suspension of mercuric acetate (47.7 g., 0.15 mole) in water (200 ml.) and tetrahydrofuran (200 ml.), and the reaction mixture was stirred for 44 hours at 25° C. Then sodium hydroxide solution (3 N, 200 ml.) was added to it, and stirring was continued for 30 minutes. After this period, a solution of sodium borohydride (3.8 g., 0.10 mole) in sodium hydroxide solution (3 N, 200 ml.) was added, and stirring was continued for another 30 minutes.

The reaction mixture was chilled to 0° C., and then it was acidified with dilute hydrochloric acid. The oil product that separated was extracted with diethyl ether (2× 100 ml.), and the combined ether extracts were washed with water and dried (MgSO$_4$). Evaporation of the ether solution gave a semi-solid product mixture that was extracted three times with ligroin (30–60°) to remove unreacted V. The residual material was dissolved in ether, ligroin (30–60°) was added to the ether solution, and the product crystallized when the resulting solution was allowed to stand in the cold. Ethyl 6-(9-hydroxydecyl-β-resorcylate VI in 63% yield was obtained after two recrystallizations from ether-ligroin (3.2 g., 0.0095 mole, M.P. 63–64° C. $^1$H N.M.R. in CDCl$_3$ with TMS: 21H envelope with main peak at 1.28δ, and with methyl doublet at 1.18, J 7 c.p.s., and two downfield peaks of ethyl triplet at 1.37δ, J. 6.5 c.p.s., rising from it; 2H triplet at 2.81δ, J 7 c.p.s.; 1H multiplet at 3.80δ; 2H quartet at 4.36δ, J 6.5 c.p.s.; 1H doublet at 6.22δ, J 2.2 c.p.s.; 1H doublet at 6.29δ, J 2.2 c.p.s.; and 3H—OH singlet at 11.52δ).

*Analysis.*—Calcd. for C$_{19}$H$_{30}$O$_5$ (percent): C, 67.4; H, 8.9. Found (percent): C, 67.4; H, 8.9.

EXAMPLE VII

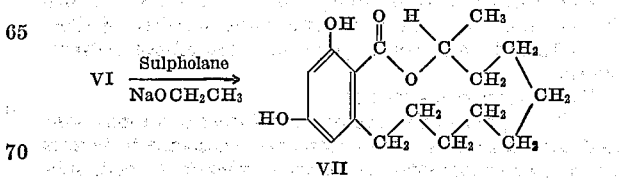

The lactonization of VI to give d,l-norzearalane VII was accomplished. To a solution of sodium ethoxide (prepared from sodium, 0.55 g., 0.024 mole, and absolute ethanol, 15 ml.) was added Sulpholane (400 ml., dried by distillation). The resulting solution was distilled at reduced pressure until all of the ethanol and about 50 ml. of Sulpholane had been removed. The ethyl 6-(9-hydroxydecyl) - β - resorcylate VI (2.7 g., 0.008 mole) and molecular sieves (35 g., Linde 5A) were added to it, and this reaction mixture was held at 130° C. for 24 hours with stirring. When the reaction mixture had cooled, it was acidified with hydrogen chloride and then it was filtered. The filtrate was extracted with diethyl ether (8× 25 ml.). The ether extracts were combined and were washed with water. The ether solution was dried over anhydrous magnesium sulfate.

The N.M.R. spectrum of the oil obtained after the ether solution had been evaporated (Rinco), showed that it contained both unreacted VI and d,l-norzearalane VII. It was then subjected to column chromatography (column 2.5 cm. in diameter and 35 cm. long, with Silica Gel preheated for 12 hours at 115° C.). The sample was eluted with a mixed solvent (90% n-butyl ether, 10% acetic acid saturated with water, and 10 fractions (10 ml. each) were collected. The norzearalane was present in fractions 1 through 5 (tlc.). These fractions were combined, and the solvent was evaporated under reduced pressure. The semisolid residue was dissolved in chloroform (1 ml.). Crystals separated when the solution was cooled. This crystalline product was isolated on a filter, and it was washed with ligroin. A second crop of crystals precipitated in the filtrate. This product was shown to be d,l-norzearalane (M.P. 245–247° C. after recrystallization from acetone. $^1$H N.M.R. in deuteroacetone with TMS: 18H envelope 1.1–1.9$\delta$ with main peak at 1.42$\delta$ and with upfield peak of methyl doublet visible at 1.18$\delta$, 2H multiplet at 2.48$\delta$; broad 2H hydroxyl in acetone at 2.8–4.0$\delta$; 1H multiplet at 5.18$\delta$; 1H doublet at 6.23$\delta$, J 2.5 c.p.s.; and 1H doublet at 6.31$\delta$, J 2.5 c.p.s.).

*Analysis.*—Calcd. for $C_{17}H_{24}O_4$ (percent): C, 69.8; H, 8.3. Found (percent): C, 69.7; H, 8.4.

The mass spectrum of this product shows the molecular ion (292), and all of the fragment ions are those expected from the previously-studied mass spectrum of zearalane described in my copending application Ser. No. 601,339, filed Dec. 13, 1966. The d,l-norzearalane of this invention is 6-(9-hydroxydecyl)-β-resorcylic acid λ-lactone.

In all of the above examples, the temperatures are in degrees centigrade. In the N.M.R. data, TMS is tetramethylsilane and DDS is sodium 2,2-dimethyl-2-silapentane-5-sulfonate. Sulpholane or sulfolane is tetramethylene sulfone. In Example VII, the function of the molecular sieves is to remove the formed ethanol and force the reaction. Other methods of removing ethanol, such as by distillation, can be employed.

The following are specific examples of animal feed compositions of this invention useful for increasing the rate of growth and feed efficiency of young animals to market weight.

EXAMPLE VIII

For young beef cattle, i.e., calves to yearlings running to two year olds, each animal is given 5 to 20 milligrams per day of the compound product in Example VII intimately admixed in about 18 to 22 pounds per head per day of a complete pelleted ration for about 180 days. The complete pelleted ration includes in addition to the compound of Example VII the following:

| | Percent |
|---|---|
| Barley | 40–43 |
| Molasses dried beet pulp | 34.5–37.5 |
| Alfalfa pellets | 8.0 |
| Tallow | 2.5 |
| Calcium carbonate | .30 |
| Urea | .30 |
| Phosphorus source | .40 |
| Salt | .50 |
| Molasses | 10.00 |
| Trace mineral | 0.5 |
| Vitamin A, 2–4 MMI.U./ton. | |

(Note: Milo or corn, for example, can be substituted for the barley.)

The compound of Example VII is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

EXAMPLE IX

For young swine, i.e., six week old pigs to about 100 pound pigs, each animal is given 5 to 20 milligrams per day of the compound of Example VII intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example VII intimately admixed in about 5½ to 10 pounds per head per day of a finisher ration until it reaches market weight of about 220 pounds. The grower and finisher ration include in addition to the compound of Example VII the following:

| | Percentage | |
|---|---|---|
| | Grower | Finisher |
| Ground yellow corn | 77 | 86.7 |
| Soybean meal (44% protein) | 16 | 6.5 |
| Meat and bone scraps (50% protein) | 2.5 | 2.5 |
| Dehydrate alfalfa meal (17%) | 2.5 | 2.5 |
| Steamed bone meal | 0.5 | 0.5 |
| Ground limestone | 0.5 | 0.3 |
| Iodized salt | 0.5 | 0.5 |
| Vitamin, antibiotic and trace mineral premix | 0.5 | 0.5 |

The compound of Example VII is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

EXAMPLE X

For 4 to 10 month old lambs weighing 50 to 70 pounds, each animal is given 1 to 15 milligrams per day of the compound of Example VII, intimately admixed in about 3 to 6 pounds per head per day of a complete ration for 30 to 90 days. The complete ration includes in addition to the compound of Example VII the following:

| | Lbs. |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example VII is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

EXAMPLE XI

For broiler, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example VII in the grower and finisher feed each of which includes in addition to the compound of Example VII the following:

| | Weight, lb. | |
|---|---|---|
| | Grower | Finisher |
| Ground yellow corn | 1,000 | 1,200 |
| Soybean meal (44% protein) | 700 | 500 |
| Fish meal (60% protein) | 100 | 80 |
| Alfalfa meal | 50 | 50 |
| Meat and bone scraps | 0 | 30 |
| Animal fat | 80 | 80 |
| Dicalcium phosphate | 35 | 40 |
| Iodized salt | 10 | 10 |
| Limestone | 15 | |
| Premix vitamins, trace minerals and antibiotics | 10 | 10 |

What is claimed is:
1. d,l-Norzearalane of the structure

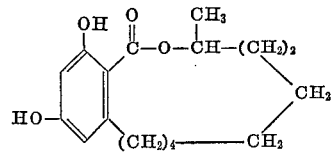

2. A method for the chemical synthesis of d,l-norzearalane which comprises the steps of
    (a) reacting 10-undecenal with malonic acid and acidifying the reaction mixture with a mineral acid to prepare 2,12-tridecadienoic acid;
    (b) reacting 2,12-tridecadienoic acid with diazomethane to prepare methyl 2,12-tridecadienoate;
    (c) reacting methyl 2,12-tridecadienoate with ethyl acetoacetate and sodium ethoxide to prepare the mono-sodium salt of ethyl 6-(9-decenyl)-dihydro-β-resorcylate;
    (d) reacting the monosodium salt of ethyl 6-(9-decenyl)-dihydro-β-resorcylate with an aqueous solution of bromine and sodium bromide to prepare ethyl 3 - bromo-6-(9-decenyl)-dihydro-β-resorcylate;
    (e) reacting ethyl 3 - bromo-6-(9-decenyl)-dihydro-β-resorcylate with sodium ethoxide and acidifying the reaction mixture with a mineral acid to prepare ethyl 6-(9-decenyl)-β-resorcylate;
    (f) reacting ethyl 6-(9-decenyl)-β-resorcylate with a suspension of mercuric acetate in water and an ether and treating the reaction mixture successively with aqueous sodium hydroxide, a solution of sodium borohydride in aqueous sodium hydroxide, and an aqueous solution of a mineral acid to prepare ethyl 6-(9-hydroxydecyl)-β-resorcylate;
    (g) and reacting ethyl 6-(9-hydroxydecyl)-β-resorcylate with sodium ethoxide in Sulpholane and acidifying the reaction mixture with a mineral acid to produce norzearalane.

References Cited

UNITED STATES PATENTS 3,373,034  3/1968  Hodge et al. _____ 260—343.2

JAMES A. PATTEN, Primary Examiner

U.S. Cl. X.R.

99—2; 4; 260—405.5, 410.9, 468, 473; 424—279